United States Patent [19]

Sugiyama et al.

[11] 4,118,323
[45] Oct. 3, 1978

[54] STRAINER

[75] Inventors: Masaaki Sugiyama, Fuji; Takuo Yuda, Sagamihara; Akira Mizusawa, Fujisawa, all of Japan

[73] Assignees: Yamakawa Industry Co. Ltd.; Nifco, Inc., Tokyo, both of Japan

[21] Appl. No.: 845,522

[22] Filed: Oct. 26, 1977

Related U.S. Application Data

[63] Continuation of Ser. No. 771,592, Feb. 24, 1977, abandoned, which is a continuation of Ser. No. 584,234, Jun. 5, 1975, abandoned.

[30] Foreign Application Priority Data

Jun. 11, 1974 [JP] Japan ................................ 49-67054

[51] Int. Cl.² .............................................. C02C 1/14
[52] U.S. Cl. ..................... 210/439; 55/378; 55/498; 210/440; 210/441; 210/443; 210/463; 210/497 R
[58] Field of Search ............... 210/232, 236, 238, 437, 210/439, 440, 441, 444, 473, 435, 438, 439, 442, 451, 452, 497 R, 445, 449, 463; 55/378, 379, 490, 491, 498; 264/267, 271, 274

[56] References Cited

U.S. PATENT DOCUMENTS

| | | | |
|---|---|---|---|
| 1,137,480 | 4/1915 | Gwynn | 210/473 |
| 3,085,689 | 4/1963 | Hering et al. | 210/232 |
| 3,767,054 | 10/1973 | Farrow et al. | 210/232 |

*Primary Examiner*—Frank Sever
*Attorney, Agent, or Firm*—Jack R. Halvorsen; Robert W. Beart

[57] ABSTRACT

Disclosed is a strainer which is suitable for use in supplying gasoline from a gasoline tank by means of a suction pipe. A strainer according to this invention comprises a cylindrical body having a net applied to the periphery thereof and a cover which is adapted to closely cover the top opening of the cylindrical body. The cover has an annular projection around the through hole at the center. In use, the cover is fit onto the top opening of the cylindrical body and then the end of a suction pipe is inserted in the cylindrical body through the annular projection.

The structures of the cylindrical body and the cover are amenable to production by injection molding, and are easy to assemble.

2 Claims, 4 Drawing Figures

STRAINER

This application is a continuation of application bearing Ser. No. 771,592 filed Feb. 24, 1977, which application is now abandoned and was a continuation of an application bearing Ser. No. 584,234 filed June 5, 1975, this latter application also having been abandoned.

This invention relates to a strainer which is adapted to connect to one end of a suction pipe extending from a gasoline tank to prevent the pipe from sucking in impurities in the gasoline.

A strainer which is herein proposed is of a plastic molding, and the central features thereof are that it comprises a cylindrical body having a bottom board integrally connected to one end and a net applied to the periphery of the body; a cover having catch means provided on the periphery of the cover, said cover being adapted to cover and closely fit to the other end of the cylindrical body to provide a complete closed and hollow-cylinder; and means to catch the end of the suction pipe in a sealing condition when inserted in the cylindrical body.

This invention will be better understood from the following description which is made with reference to the drawings.

Figure 1:
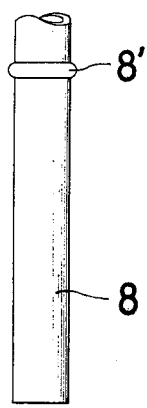
FIG. 1 is a longitudinal section of a strainer according to this invention in a developed condition.
Figure 2:
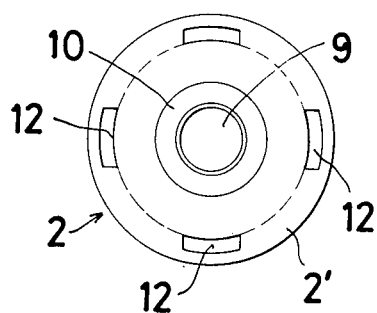
FIG. 2 is a plane view of a covering block.
Figure 2:
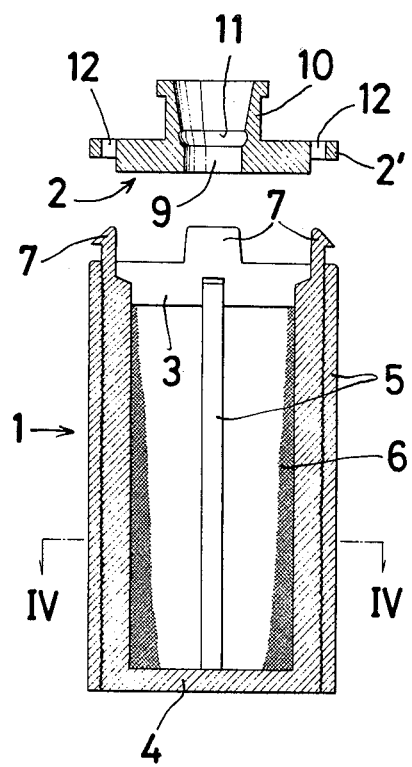
Figure 3:
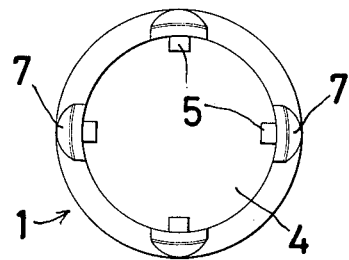
FIG. 3 is a plane view of a strainer body.
Figure 4:
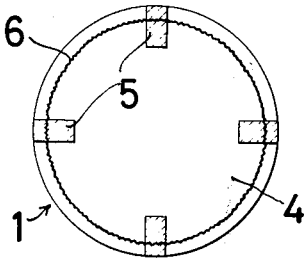
FIG. 4 is a sectional view of the strainer taken along the line V—V of FIG. 1.

Referring to the accompanying drawings, 1 is a strainer body, and 2 is a cover to be attached to the strainer body 1 to close the top opening of the strainer body.

The strainer body 1 comprises a circular top frame 3, a circular bottom board 4 and plural supporters 5 each connecting the top frame with the bottom board and is thus shaped in the form of a cylinder. A fine-meshed net 6 is applied to the circumference of the cylinder body. The strainer body is made of plastics by injection-molding, and therefore the circular top frame 3, the circular bottom board 4 and the supporters 5 are simultaneously and integrally made as a whole, using a single injection mold die. A fine-meshed net 6 is put in the mold die, and then the material is injected in the mold die. Therefore, the net is partially embedded and integrally connected to the different elements of the injection-molded body 1. Thus, the strainer body can be produced by a single injection-molding of plastics.

As shown in the drawings, the circular top frame 3 of the strainer body 1 has nail catches 7 integrally connected to the upper-surface of the top frame 3. These nail catches 7 function to catch the cover 2 when it is put on the top frame of the strainer body.

The cover 2 is shaped in a circular form so as to fit top frame 3 of the strainer body 1. The covering block 2 has a connecting through hole 9 at the center thereof and a tubular connector 10 molded onto the circumference of the through hole 9. The connector 10 has an upward-diverging hole, which communicates with the connecting through hole 9. The upward-diverging shape of the connector 10 facilitates the insertion of a suction pipe 8 in the strainer body. The connector 10 has an annular groove 11 around the lower and inner circumference thereof, which groove is adapted to catch an annular bulge 8' of the suction pipe 8. The cover 2 has an annular flange extension 2' from the circumference of the cover. The flange extension has as many holes 12 as the number of nail catches 7 of the top frame of the strainer body. These holes 12 are so positioned as to allow the nail catches 7 to snap in the holes of the flange extension when cover is put on the strainer body.

In assembling the strainer, the cover 2 is put on the top of the strainer body 1, allowing the nail catches 7 of the top frame to snap in the holes 12 of the flange extension of the cover.

Thus, the cover 2 is closely fitted to the top opening of the strainer body. A suction pipe is inserted in the connecting through hole 9 of the cover, and is positively held with the bulge portion 8' of the suction pipe in the annular groove 11 of the tubular connector 10. As is apparent from the above, the strainer of this invention is easily assembled.

The strainer according to this invention has two separate members. These members can easily be made of plastics by injection-molding, and they are assembled simply by putting the cover onto the strainer body. Therefore, the manufacturing work is reduced to simplest operation possibly, which is most advantageous to mass production at low cost.

The cover of the strainer of this invention has a connecting through hole, and therefore a suction pipe can be easily attached to the strainer simply by inserting it in the connecting through hole. Thanks to this structure operability is substantially improved, compared with the conventional strainers.

In the particular embodiment given above, the cover is connected to the strainer body by putting the nail catches of the top frame in the holes 12 of the flange extension of the cover. Otherwise, a number of nail catches, not shown, may be provided on the flange extension of the cover so as to catch the circumference of the top frame 3 of the strainer body when the cover is placed on the strainer body thus, the nail catches may be affixed to either member, the top frame of the strainer body or the flange extension of the cover to meet occasional requirements in design, and the nail may be of any appropriate shape whatever.

What is claimed is:

1. A plastic strainer in combination with a suction pipe having an annular projection spaced a predetermined distance from the free end of said pipe, said strainer including a strainer body member having a tubular top frame, imperforated bottom board, a plurality of axially extending circumferentially spaced support elements with each support element integrally attached at opposite ends to said top frame and said bottom board, a plurality of resilient arms extending axially between the free end of said top frame, said arms including shoulder means intermediate their length, a tubular filtration net integrally attached to and embedded in and extending between the opposed surfaces of said top frame and of said bottom board, said net extending throughout the axial extent of said support elements and embedded and integrally connected and supported therein along a line intermediate the radial extent of said elements, a centrally appertured cover member removably attached to said strainer body, said cover member including a plurality of circumferentially spaced complementary openings equal in number to said arms for telescopingly accepting said arms within shouldered portion of said arms engaging the outer surface of said cover when said cover is seated against said top frame, an open ended tubular connector element molded integrally with the cover top and communicating with said central apperature to provide a continuous bore through said connector element and said cover, said bore in said tubular connector element being tapered from its free end to an annular groove circumferentially disposed therein and adapted to accept said annular projection on said suction pipe in complementary relation when the suction pipe is telescoped through the tubular connector element end cover whereby said suction pipe free end is maintained in spaced relation to said bottom board being spaced a greater distance from said cover element the said predetermined distance.

2. A strainer of the type claimed in claim 1 wherein the tubular top frame is circular, said arms being equal in number to and being axial extensions of said supporting elements and extending axially between said circular top frame.

* * * * *